(12) United States Patent
Kellner et al.

(10) Patent No.: US 7,165,027 B2
(45) Date of Patent: Jan. 16, 2007

(54) METHOD OF CONTROLLING DEVICES VIA SPEECH SIGNALS, MORE PARTICULARLY, IN MOTORCARS

(75) Inventors: Andreas Kellner, Aachen (DE); Alexander Fischer, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 946 days.

(21) Appl. No.: 09/935,235

(22) Filed: Aug. 22, 2001

(65) Prior Publication Data

US 2002/0065584 A1    May 30, 2002

(30) Foreign Application Priority Data

Aug. 23, 2000    (DE) ................ 100 41 456

(51) Int. Cl.
   *G10L 15/20*    (2006.01)
(52) U.S. Cl. ............ 704/233; 704/243; 704/244
(58) Field of Classification Search ........ 704/233, 704/226–228, 243, 244, 211, 222, 256.5, 704/258, 256.8, 246, 234; 381/92, 328, 356, 381/380, 94.1; 379/406.07, 430, 433.08, 379/202.01

See application file for complete search history.

(56) References Cited

U.S. PATENT DOCUMENTS

| | | | | |
|---|---|---|---|---|
| 4,360,304 A | * | 11/1982 | Brewer et al. | 414/191 |
| 5,590,241 A | * | 12/1996 | Park et al. | 704/227 |
| 5,924,065 A | * | 7/1999 | Eberman et al. | 704/231 |
| 5,949,886 A | * | 9/1999 | Nevins et al. | 381/57 |
| 5,960,397 A | * | 9/1999 | Rahim | 704/244 |
| 5,970,446 A | * | 10/1999 | Goldberg et al. | 704/233 |
| 6,418,411 B1 | * | 7/2002 | Gong | 704/256.5 |
| 6,584,439 B1 | * | 6/2003 | Geilhufe et al. | 704/270 |
| 6,839,670 B1 | * | 1/2005 | Stammler et al. | 704/251 |

FOREIGN PATENT DOCUMENTS

| | | | |
|---|---|---|---|
| EP | 0 094 449 | * | 11/1983 |
| EP | 0094449 A1 | | 11/1983 |

* cited by examiner

*Primary Examiner*—Vijay B. Chawan

(57) ABSTRACT

The invention relates to a method of controlling function units of a motorcar or of devices (1a, 1b) installed in a motorcar, via speech signals, in which acoustic signals occurring in the motorcar, which contain noise signal portions that depend on the operating state and/or operation environment of the motorcar, and speech signal portions, as the case may be, are applied to a speech recognition system (3) and the speech recognition system (3) uses acoustic references (8) which are selected and/or adapted in dependence on detected data of the operating state and/or operation environment. The invention is not restricted to speech control in the domain of motorcars.

8 Claims, 2 Drawing Sheets

Figure 1:
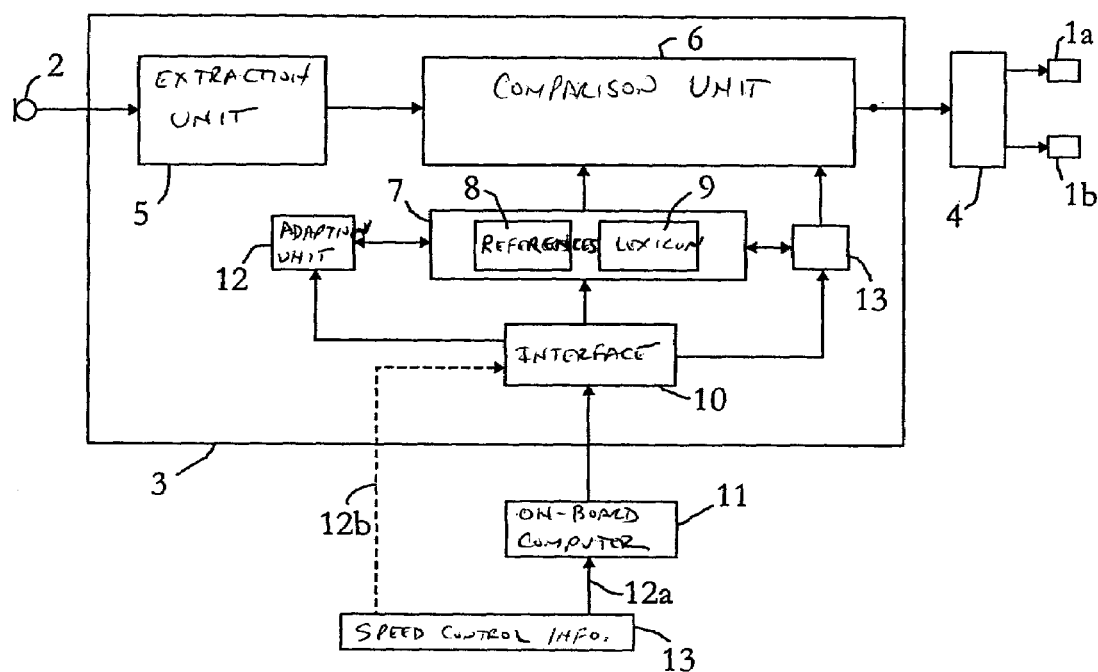

METHOD OF CONTROLLING DEVICES VIA SPEECH SIGNALS, MORE PARTICULARLY, IN MOTORCARS

The invention relates to a method of controlling function units of a motorcar, or of devices installed in a motorcar, by means of speech signals. The invention also relates to a hardware configuration for implementing this method.

Basically, the method according to the invention permits to be used for any speech-controlled devices in which noise signal portions applied to the device depend on the state of operation and/or the operation environment of the respective device.

When function units of a motorcar (for example, windscreen wiper motor) and of devices installed in a motorcar (for example, radio control, navigation system or mobile telephone) are controlled by means of speech signals to be recognized by a speech recognition system, noise signals are to be taken into account which depend on the operating state and/or operation environment of the motorcar to avoid faulty control of the function units or devices, respectively. From JP 57-30913 (A) is known to detect by means of sensors both the speed of a motorcar and the gear shifted into. A reference voltage of a noise signal is generated from the sensor signals, which reference voltage indicates a measure for the current noise level (noise signal level) inside the motorcar. The noise signal reference voltage is compared to the output voltage of a speech input unit. When speech control signals are available, the speech input unit receives acoustic signals which contain both noise signal portions and speech signal portions, which is reflected in the output voltage of the speech input unit. The output voltage of the speech input unit is compared to the noise signal reference voltage. If the output voltage of the speech input unit is higher than the noise signal reference voltage, a speech recognition system is activated. If the output voltage of the speech input unit drops to below the noise signal reference voltage, the speech recognition system is deactivated.

From JP 6-83387 (A) is known to provide a vibration sensor in a motorcar to assess the vibration of the motorcar as a noise source. Furthermore, a first microphone is installed inside the motorcar to detect noise signals occurring in the interior of the motorcar. A second microphone in the interior of the motorcar is used for detecting speech signals which are to be recognized by a speech recognition system. The second microphone receives acoustic signals, however, which contain noise signal portions in addition to the speech signal portions. With the aid of the signals of the vibration sensor, with the aid of the microphone signals of the first microphone and with the aid of two adaptive filters, the noise signal level in the microphone signals generated by the second microphone is reduced; the thus generated signals with reduced noise signal portions are applied to a speech recognition system.

It is an object of the invention to effectively counteract noise signal effects by means of the method defined in the opening paragraph.

The object is achieved for applications to motorcars in that acoustic signals occurring in the motorcar, which contain noise signal portions that depend on the operating state and/or operation environment of the motorcar and speech signal portions, as appropriate, are applied to a speech recognition system, and the speech recognition system uses acoustic references which are selected and/or adapted in dependence on detected data of the operating state and/or operation environment.

The method according to the invention is advantageous in that, based on data of operating states or operation environment which are often each easy to determine, the set for the automatic speech recognition is suitably adapted to acoustic references to be used. In a motorcar, data about the operating state or operation environment can be read out from, for example, an on-board computer, which is connected to one or more detectors for determining the operating state or the operation environment of the motorcar. Starting from the determined operating state or operation environment, respectively, the noise signal portions are estimated indirectly. An extraction of the noise signal portions from the acoustic signals fed to the speech recognition system can thus be made redundant. An estimation of the noise signal portions may be made so that predefined acoustic references are selected in dependence on the detected operating state and/or operation environment to model speech pauses in which the acoustic signals only have noise signal portions. In correspondence therewith, the presence of speech signal portions can be detected which is then the case when there is no speech pause; in this manner an erroneous detection of the presence of speech signal portions when noise signal portions are changed can be avoided. The measures according to the invention enhance the reliability and safety of use of the whole system.

Also acoustic references representing speech signal portions can be adapted via the detected data of the operating state or operation environment, so that these superimposed noise signal portions are represented by the acoustic references.

An arrangement suitable for implementing the method according to the invention is stated in patent claim 7.

For optional speech-controlled devices, the object is achieved accordingly as defined in the characteristic features of patent claims 7 (method) and 8 (arrangement).

These and other aspects of the invention are apparent from and will be elucidated with reference to the embodiments described hereinafter.

Figure 2:
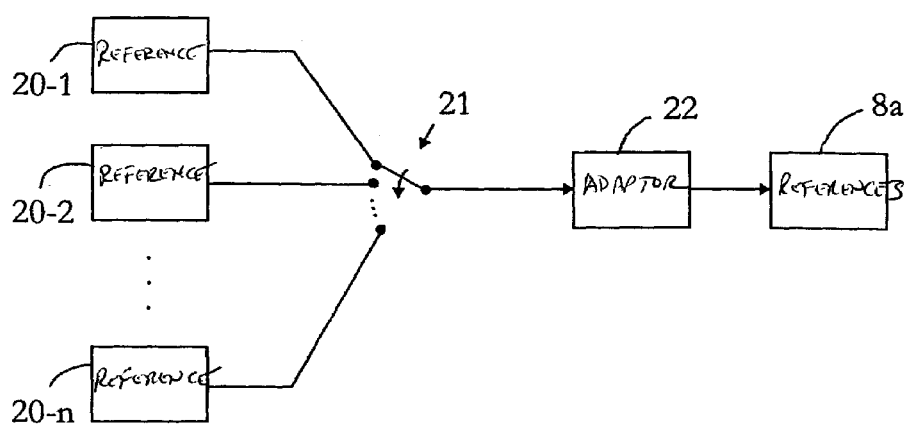
Figure 3:
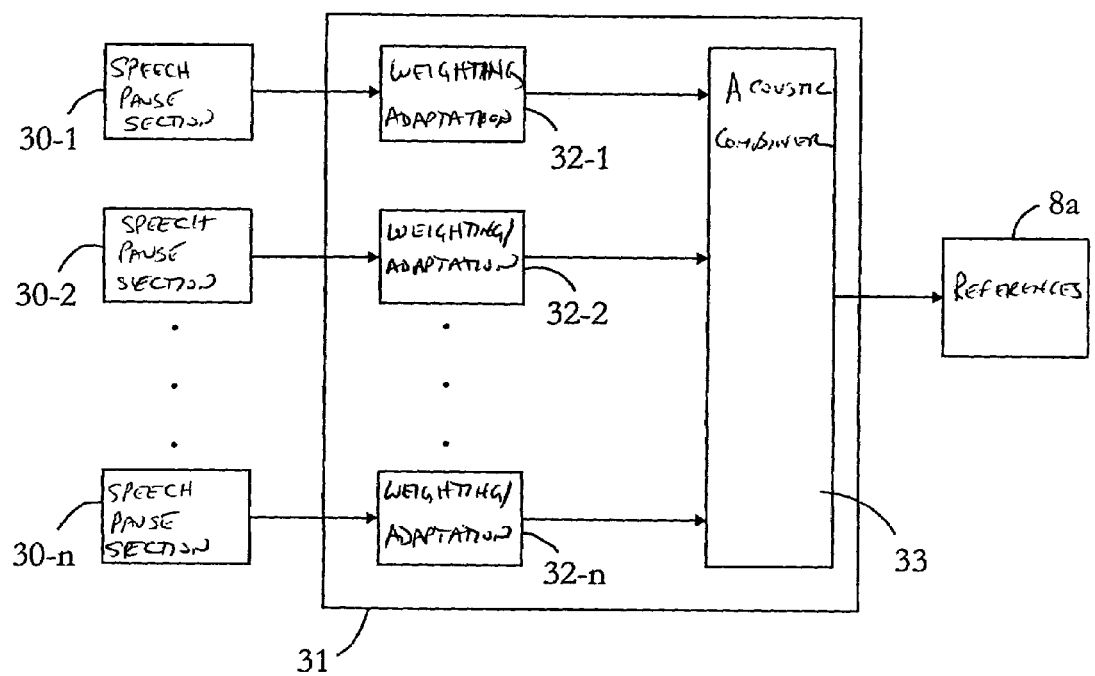

In the drawings:

FIG. 1 shows the essential components for implementing the method according to the invention in a motorcar, FIG. 2 shows a first possibility of generating an acoustic reference for a speech pause section and FIG. 3 shows a second possibility of generating an acoustic reference for a speech pause section.

The block diagram shown in FIG. 1 describes the control of devices or function units in a motorcar. The devices/function units are represented here, for example, by the blocks 1a and 1b. The control takes place via speech signals which are fed via a microphone 2 to an automatic speech recognition system 3, whose recognition results are evaluated by a function unit 4 which causes a conversion into electric control signals to be supplied to the devices/function units 1a and 1b.

A function unit 5 describes the extraction of features of microphone signals supplied by the microphone 2, where features for the individual successive signal sections are customarily combined to feature vectors. For the feature analysis, an acoustic signal is, for example, sampled, quantized and, finally, subjected to a cepstral analysis. Then there is a subdivision of the acoustic signals into successive frames which partly overlap; for each frame a feature vector is formed. The feature vector components are formed by the determined cepstral values. Function block 6 describes customary procedures for comparison, in which the feature vectors are compared to an acoustic model 7 via customary search procedures, which lead to the speech recognition result applied to the function unit 4. The comparison 6 and the acoustic model 7 are based on so-called Hidden Markov Models. The acoustic model 7 has acoustic references 8 and a lexicon 9. A respective acoustic reference is then assigned to a word sub-unit of one or more phonemes. The lexicon 9 defines associated sequences of word sub-units in accordance with the words combined in the lexicon.

The speech recognition system 3 includes an interface 10 which sets up a connection to an on-board computer 11 of the motorcar. The on-board computer 11 in its turn is connected by a connection 12*a* to at least one detector, which detects operating state data and/or operation environment data and applies them to the on-board computer 11, which stores these data. The data of the operating state and/or operation environment are applied to the interface 10, which further conveys these data to a function unit 12, which adapts them to the respectively detected operating state or detected operation environment, to adapt the acoustic references 8. Basically, the interface 10 can also be coupled without an intermediate circuit of an on-board computer to the detector 13 (connection 12*b*). A detected operating state would be, for example, the operating state of a blower or also the respective speed of the motorcar. The operation environment data could indicate, for example, rainy weather or also the actual condition of the road on which the motorcar is driving.

Preferably, the described system can generate speech pause models with suitable acoustic references 8. For speech pauses an acoustic signal received from the microphone 2 only contains noise signal portions, but no speech signal portions by which the devices/function units 1*a* or 1*b* are to be controlled.

An embodiment of the invention comprises, in dependence on a detected operating state or a detected operation environment, confining the vocabulary of the speech recognition system 3, which is combined by the lexicon 9 to a sub-set of words which are rendered available as effective speech control signals (function block 13). With this arrangement the calculation operations necessary for the comparison procedures of the function block 6 are reduced.

FIG. 2 shows an example of generating an acoustic reference 8*a* from the set of acoustic references 8. By the function unit 12 the basic reference, which had already been assigned to the operating state or operation environment before the speech recognition system 3 was taken into operation, and which best corresponds to the actually detected operating state or operation environment, respectively, is selected from a set of a priori given and predefined basic references 20-1, 20-2 to 20-n for speech pause sections. The selection of a basic reference is symbolically shown by a switch 21. Function block 22 combines an optional adaptation of the selected basic reference to reach the more accurate modeling of the detected operating state or operation environment, respectively, to thus form the acoustic reference 8*a* to be used for the respective speech pause section. If, for example, an acoustic basic reference corresponds to a noise signal portion that is derived from rain noise, during the adaptation in block 22 an adaptation will take place to the detected strength of the rain, where the strength of the rain corresponds to a respective interference/noise signal level in the motorcar.

FIG. 3 shows a further variant for the generation of the acoustic reference 8*a* for a speech pause section. Just like FIG. 2, already a priori predefined basic references are provided for speech pause sections (blocks 30-1, 30-2 to 30-n) by means of which the acoustic reference 8*a* is formed. In the embodiment shown in FIG. 3, however, not a single basic reference is selected. On the contrary, all the basic references are applied to a function unit 31 in which first a weighting and, as the case may be, also an adaptation of the basic references is performed (blocks 32-1, 32-2 to 32-n) in dependence on the respectively detected operating state or operation environment. The basic references weighted/adapted in this manner are finally combined to a single acoustic reference in a unit 33, which is the acoustic reference 8*a* to be used for the speech pause section under consideration.

The invention is not restricted to speech pause modeling. Basically, also the z word sub-units can be adapted to respective acoustic references 8 in like manner to a detected operating state or operation environment of the motorcar. The acoustic reference 8*a* would then form the base for the adaptation of acoustic references 8 that represent word sub-sections, to model noise signal portions of an acoustic signal captured by the microphone 2.

In addition, the invention described is not restricted to the use in motorcars. The invention is basically applicable to all speech-controlled devices in which noise signals are superimposed on speech control signals, which noise signals can be indirectly determined by the detection of the operating state or operation environment of such a device.

The invention claimed is:

1. A method of controlling function units of a motorcar, or of devices (1*a*, 1*b*) installed in a motorcar, by means of speech signals, the method comprising the steps of:

receiving acoustic signals occurring in the motorcar, which contain noise signal portions and speech signal portions, applying the received acoustic signals to a speech recognition system (3), the speech recognition system using acoustic references (8) which are selected in dependence on the operating state and/or operation environment to determine an estimate of noise signal portions, and adapting the estimate of noise signal portions during at least one period containing a noise signal portion but no speech signal portion.

2. A method as claimed in claim 1, wherein an adaptation is provided (22, 32-1, . . . 32-n) of the selected acoustic references in dependence on the operating state and/or operation environment of the motorcar.

3. A method as claimed in claim 1, wherein acoustic basic references are combined (33) in dependence on the operating state and/or operation environment of the motorcar.

4. A method as claimed in claim 1, further comprising the step of:

determining operating state and/or operation environment of the motorcar by reading from an on-board computer (11) of the motorcar and/or by means of one or more detectors (13) installed in the motorcar.

5. A method as claimed in claim 1, wherein parts of a vocabulary (9) of the speech recognition system (3) are determined (13) that represent speech control signals that have their effect on the control of function units of the motorcar or on devices installed inside the motorcar.

6. An arrangement for controlling function units of a motorcar, or of devices (1*a*, 1*b*) installed in a motorcar by means of speech signals, the arrangement comprising:

at least one microphone (2) for converting acoustic signals occurring in the motorcar, which acoustic signals contain noise signal portions and speech signal portions, and a speech recognition system (3) coupled to the microphone (2) for receiving the acoustic signals and at least one of a plurality of acoustic references (8) in dependence on the operating state and/or operation environment to determine an estimate of noise signal portions, and adapting said estimate of noise signal portions during at least one period containing a noise signal portion but no speech signal portion.

7. A method of controlling a device via speech signals, in which
- acoustic signals, which contain noise signal portions and, speech signal portions, are applied to a speech recognition system and
- the speech recognition system uses acoustic references which are selected in dependence on the operating state and/or operation environment of the device to determine an estimate of the noise signal portions, and
- adapting said the estimate of the noise signal portions during at least one period containing a noise signal portion but no speech signal portion.

8. An arrangement comprising a device controllable via speech signals, wherein

- acoustic signals which contain at least noise signals portions are applied to a speech recognition system and

- the speech recognition system uses acoustic references which are selected in dependence on the operating state and/or operation environment of the device to determine an estimate of the noise signal portions, and

- adapting said estimated noise signal portions during at least one period containing a noise signal portion but no speech signal portion.

* * * * *